United States Patent

Ohzeki et al.

[11] Patent Number: 6,080,269
[45] Date of Patent: Jun. 27, 2000

[54] GELATINE RECOVERY DEVICE

[76] Inventors: Fumiaki Ohzeki, 685-201 Ohmagi, Urawa-shi, Saitama; Masaru Ishikawa, 1-23-14, Nishi-Mabashi, Matsudo-shi, Tiba, both of Japan

[21] Appl. No.: 09/073,554

[22] Filed: May 6, 1998

[30] Foreign Application Priority Data

May 6, 1997 [JP] Japan .................................. 9-131732

[51] Int. Cl.⁷ .................................................. B32B 35/00
[52] U.S. Cl. .................... 156/344; 156/584; 100/153; 264/37.18; 264/37.3
[58] Field of Search ..................... 156/344, 584; 100/153; 264/37.18, 37.19, 37.3, 37.31, 37.32, 37.33

[56] References Cited

U.S. PATENT DOCUMENTS

| | | | |
|---|---|---|---|
| 3,590,427 | 7/1971 | Mehta | 425/317 |
| 3,982,876 | 9/1976 | Eisenbach | 264/261 X |
| 4,435,144 | 3/1984 | Kemper | 425/332 |
| 4,585,561 | 4/1986 | Zlokarnik et al. | 210/705 |
| 4,755,252 | 7/1988 | Held | 156/583.5 X |
| 4,817,367 | 4/1989 | Ishikawa et al. | 53/454 |
| 5,074,102 | 12/1991 | Simpson et al. | 53/454 |
| 5,288,408 | 2/1994 | Schmidt et al. | 210/634 |
| 5,538,414 | 7/1996 | Kobayashi et al. | 425/371 X |
| 5,761,886 | 6/1998 | Parkhideh | 53/454 |

FOREIGN PATENT DOCUMENTS 60-45537  9/1985  Japan .
5-310980  8/1994  Japan .

*Primary Examiner*—Mark A. Osele
*Attorney, Agent, or Firm*—Flynn, Thiel, Boutell & Tanis, P.C.

[57] ABSTRACT

A gelatine recovery device feeds rod-like gelatine film pieces between a high-speed belt and low-speed belt, separates unified gelatine film into two parts by frictional contact and removes a mold release agent coating the film pieces which agent is then coated on the surface of the belts. Gelatine film pieces are recovered at the belt end and the mold release agent is removed from the belts by blades. After belt surface passes by the blades, the belt receives gelatine pieces and repeats the recovery process. In this gelatine recovery device, gelatine can be recovered without using a large quantity of water, and thus an effluent treatment system is unnecessary.

8 Claims, 2 Drawing Sheets ns, reprinting a mold release agent onto the belt surface previously described with the frictional contact of separated rod-like gelatine, recovering rod-like gelatine already removed from a mold release agent at the belt end, and also scraping pressure-sticking mold release agent on the belt surface off, rubbing by blades.

GELATINE RECOVERY DEVICE

BACKGROUND OF THE INVENTION

(1) Field of the Invention

This invention relates to the Gelatine Recovery Device which recovers gelatine gelatin by scraping a mold release agent off from gelatine sheets with punched holes, which yields in production of soft capsules.

(2) Description of the Prior Art

In fields of medicament, foodstuffs and cosmetics, a big amount of gelatine sheets having punched holes yields in the process of encapsulating medicament, etc. into gelatine capsules. This processing of soft capsules is to punch capsules out, inserting medicament, etc. between gelatine sheets coated on both sides with a mold release agent. Gelatine sheets with many punched holes yields in the process are made by applying pressure to stick two pieces of gelatine films together. The amount of gelatine sheets with punched holes is up to about 50 wt. % of an initial gelatine sheet.

So far, proposition of how to recover gelatine from gelatine sheets with punched holes for recycling purpose had been made. It was necessary to peel two sticked sheets off to remove a mold release agent inserted in the middle layer of gelatine sheets with punched holes. The conventional way was to strip a mold release agent in the middle layer by properly swelling gelatine sheets with water and then cutting them.

And conventional gelatine recovery devices used a crushing apparatus. Gelatine sheets with punched holes mixed with water were delivered to a crushing apparatus, crushed into the size of approx. 1 mm2 peeling two sticked sheets off by swelling action. Mold release agent stuck onto the surface was separated by turn-cutting or frictionizing. Then, to recover gelatine, liquid after completing crushing operation was filtrated, and separated into water and mold release agent letting filtrate lie calmly at a certain period. There were two kinds of crushing apparatuses, and either roll-rotating or handmill type was used, but it required water approx. 10 l/min. for 10 kg of gelatine sheets with punched holes cut in a piece of approx. 10 cm2 in order to complete the said separation.

SUMMARY OF THE INVENTION

In such conventional gelatine recovery devices, as they required a large quantity of water and could not get water dischargeable only by filtration and separation of liquid letting filtrate lie calmly in a pit, they needed the effluent treatment system separately. However, it was the fact that gelatine recovery devices did not come true because they required huge capital investment.

An object of this invention is to provide the gelatine recovery device which solves problems described above, recovers gelatine without using a large quantity of water and which the effluent treatment system is unnecessary.

To solve the said problems, the gelatine recovery device with this invention is characterized, in the gelatine recovery device by peeling a mold release agent off from gelatine sheets with punched holes which yields in the process of producing soft capsules, by forming rod-like gelatine cutting gelatine sheets with holes with a cutter, inserting rod-like gelatine in between belts which rotate with different feeding speed, rotating and moving it by the frictional contact with belts facing at each other, separating rod-like gelatine stuck together by frictional power into two parts, adhering or reprinting a mold release agent onto the belt surface previously described with the frictional contact of separated rod-like gelatine, recovering rod-like gelatine already removed from a mold release agent at the belt end, and also scraping pressure-sticking mold release agent on the belt surface off, rubbing by blades.

A gelatine sheet with punched holes, for example, is composed of two pressure-sticking gelatine films with thickness about 0.8 mm. Belt-like gelatine sheets with holes yields continuously are cut by a cutter in rod-like shape. An index of cutting width of these rod-like gelatine is the thickness of one piece gelatine film. The amount of clearance between the two belts catching rod-like gelatine should be fixed and kept with the desired distance so that rod-like gelatine can be rotated and moved by the frictional contact, and also can be rotated and moved even after being separated into two parts as well.

For this reason, it is desirable that the clearance is shorter than that of one piece of gelatine film. As belts facing at each other have different feeding speed, the surface of two belts catching rod-like gelatine between them is moved relatively, and then rotating power is given to rod-like gelatine by frictional power of both belts and separated into two parts. Therefore, difference of feeding speed among two belts must be set up to get sufficient movement of rotation. Rod-like gelatine separated into two parts is coated with a mold release agent on each surface, and reprinted or removed by having friction contact on the belt surface. Rod-like gelatine with removed mold release agent is recovered at the belt end while a mold release agent pressure-sticking to the belt surface is scraped off, being rubbed by blades and concentrated in a pit. The points where belts and blades contact are desireable to be smooth so that a mold release agent can be surely scraped. The belt surface passing through blades is moved to the caught-in part of rod-like gelatine again and gets stuck with a new mold release agent.

DETAILED DESCRIPTION OF THE INVENTION

Figure 1:
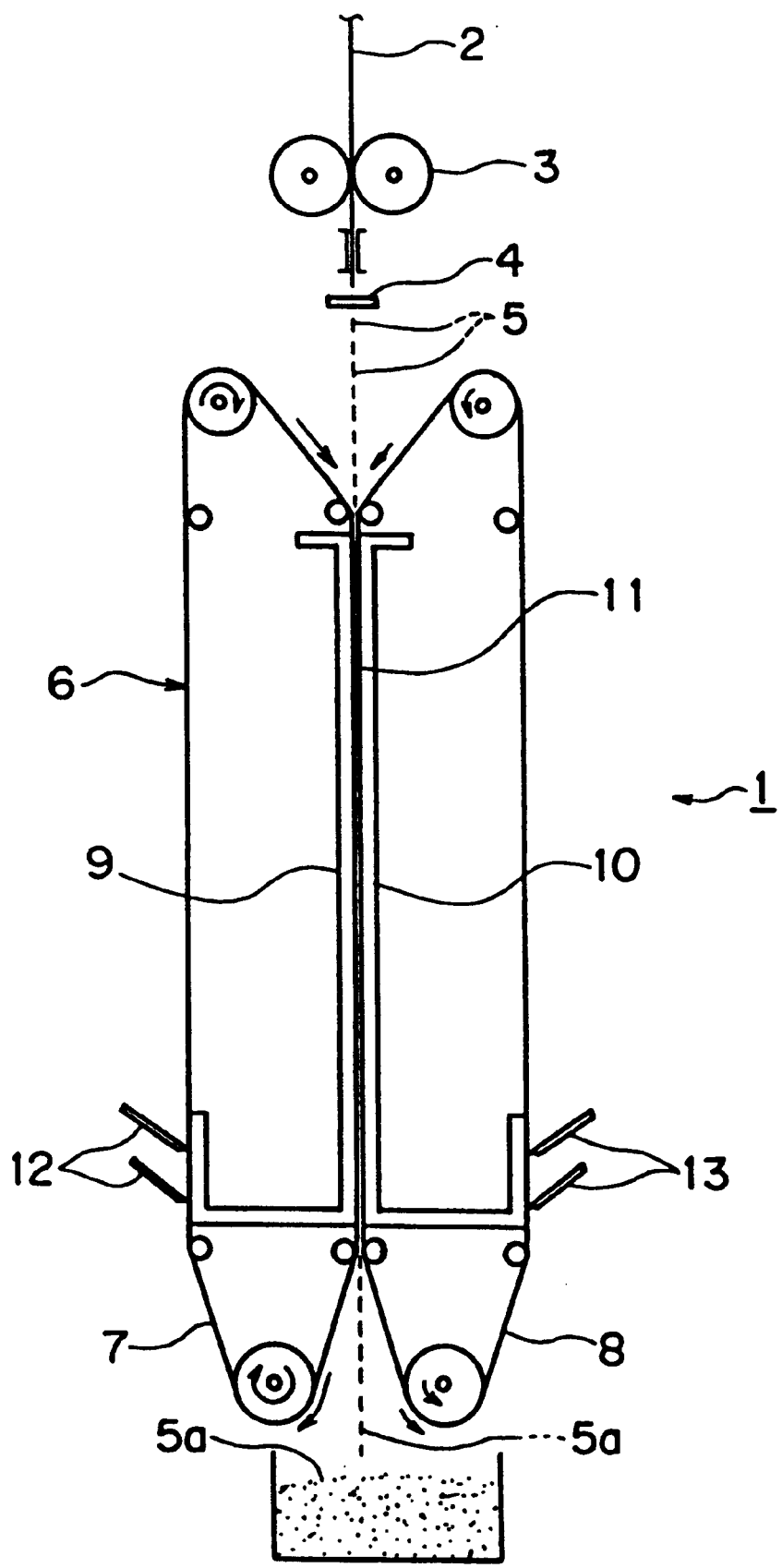
FIG. 1 is a view showing schematic structure of the gelatine recovery device.

Next, embodiments of this invention will be described in detail with reference to the attached drawings. FIG. 1 shows schematic structure of the gelatine recovery device in this invention. Gelatine recovery device 1 delivers belt-like and long gelatine sheets 2 with punched holes from the roller 3 to the cutter 4, which are continuously generated by a unshown rotated punching apparatus, and cut these into rod-like gelatine 5. This rod-like gelatine 5 is dropped naturally, and feeded in between a high-speed belt 7 and low-speed belt 8 of a belts feeding apparatus 6.

As these belts 7 and 8 feed rod-like gelatine 5 downward, caught in between them and, at the parts facing at, guide materials 9 and 10 are equipped with belts to maintain the clearance between two belts as less than thickness of one piece of gelatine film. Both belts 7 and 8 passing through the caught-in part 11 of rod-like gelatine rubs against blades 12 and 13. The surface of both belts 7 and 8 is made smoothly so that mold release agent can be scrubbed sufficiently.

Rotating speed of low speed belt 8 is determined by considering feeding speed of belt-like gelatine sheet 2, however, it is desirable that difference of rotating speed of both belts is big enough to effectively rotate and move rod-like gelatine by frictionizing. The rotating direction of low speed belt 8 may be reversed from arrow direction in FIG. 1.

The action of rod-like gelatine is described with reference to FIG. 2.

Figure 2:
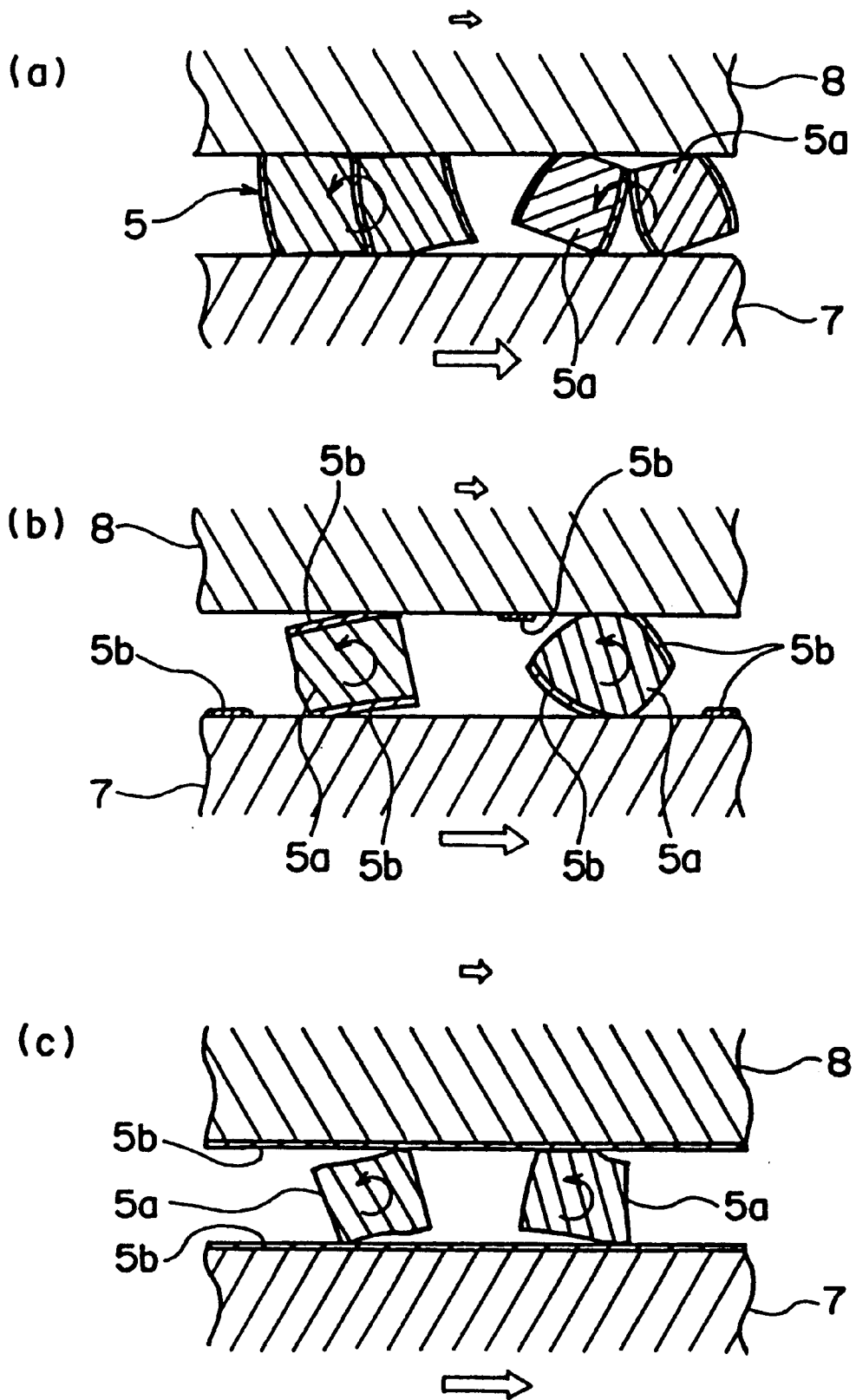
FIGS. 2(a)–2(c) are is the magnified cross sectional view showing the caught-in part of rod-like gelatine between belts of the gelatine recovery device.

FIG. 2 is the magnified cross sectional view showing the caught-in part of rod-like gelatine. As the belts 7 and 8 faced at each other differs feeding speed, the caught-in face of rod-like gelatine is relatively moved, given rotating power toward the arrow direction by both frictional power, and gradually separated into two parts of unified gelatine film 5*a*. (FIG. 2(*a*)). Though gelatine film 5*a* separated into two parts is coated by a mold release agent 5*b* on it, the mold release agent reprints to or adheres on the belt surface by frictional contact (FIG. 2(*b*)), and consequently all mold release agents can be removed while belts are kept on rotating. (FIG. 2(*c*)). Gelatine film 5*a* removed of a mold release agent is recovered at the belt end as shown in FIG. 1.

On the other hand, mold release agent stuck to the belt surface is scraped off by the blades 12 and 13, and concentrated in the unshown pit. The belt surface passing through blades 12 and 13 moves into the caught-in part 11 of rod-like gelatine again and sticked mold release agent newly.

Flowing paraffin is normally used most as a mold release agent, but other agents like cooking oil, neutral fatty acid tryglyceride or propylene glycol fatty acid ester, etc., are also used. And gelatine film is fundamentally composed of gelatine, glycerin as a plasticizer and water, but there are other things such as plasticizer except glycerin, pigment or preservative, etc. to be added.

As a result of making the treatment of separation and recovery of gelatine by using the gelatine recovery device of this invention, 1.1 wt. % of a mold release agent included in gelatine sheets with punched holes was reduced to 0.02 wt. % and it made it possible enough to recycle those as gelatine materials to produce soft capsule products.

As described above, the gelatine recovery device of this invention reprints a mold release agent on the belt and separates it by feeding rod-like gelatine in its caught-in part of belts rotating at different feeding speed and moving it, it does not need a large quantity of water and makes effluent treatment system unnecessary. Therefore, gelatine recovery work can be made effectively at a lower cost.

What is claimed is:

1. A method for separating and recovering gelatine by removing a mold release agent coating a gelatine sheet, comprising:

cutting the mold release agent coated gelatine sheet into, separate mold release agent coated gelatine pieces;

rotating a pair of adjacent endless belts at different speeds;

feeding the mold release agent coated gelatine pieces between the pair of endless belts;

removing the mold release agent from the gelatine pieces and adhering the mold release agent to the belts;

recovering the gelatine pieces released by the pair of endless belts; and removing the mold release agent from the belts.

2. The method of claim 1, the step of removing the mold release agent from the belts comprising scraping the mold release agent from the belts using blades.

3. The method of claim 1, the step of rotating the belts at different speeds comprising continuously rotating the belts in the same direction.

4. The method of claim 1, the step of rotating the belts at different speeds comprising rotating the belt operating at a lower speed in an opposite direction from the belt operating at a higher speed.

5. The method of claim 1, including rotating and moving the gelatine pieces along the belts, by frictional contact with the belts and by the different speeds of the belts.

6. The method of claim 5, in which the gelatine pieces are of rod-shape and including separating a rod-shape gelatine piece into two parts by frictional contact with the belts and by the different speeds of the belts.

7. A gelatine recovery device for separating and recovering gelatine by peeling a mold release agent coating from a gelatine sheet having holes, comprising:

a cutter for cutting the gelatine sheet into rod-shaped gelatine pieces;

first and second endless belts positioned below said cutter and aligned with each other along respective lengths thereof for catching the rod-shaped gelatine pieces therebetween, said first and second belts operating at different speeds for rotating the rod-shaped gelatine pieces between the belts and adhering the mold release agent to the belts; and blades aligned adjacent said first and second endless belts for removing the mold release agent from the belts.

8. The gelatine recovery device of claim 7, including rollers for receiving the gelatine sheet and transferring such sheet to the cutter, said cutter being located below said rollers.

* * * * *